Figure 1:
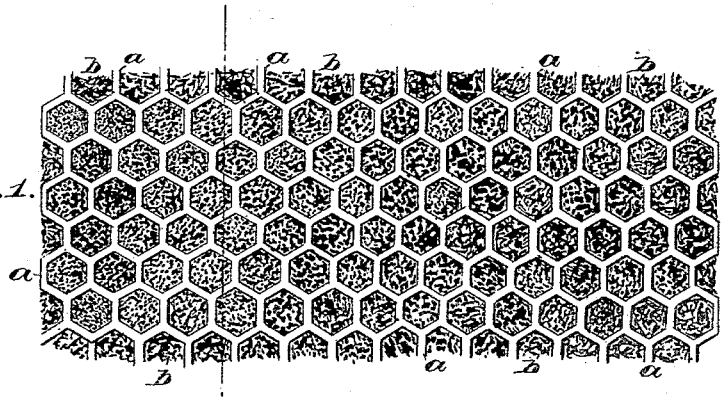

(No Model.)

J. W. SWAN.
SECONDARY BATTERY.

No. 318,828. Patented May 26, 1885.

Attest
Wm. J. Danner
Philip Mauro

Inventor
Joseph Wilson Swan
by A. Pollok
his attorney.

UNITED STATES PATENT OFFICE.

JOSEPH W. SWAN, OF LAURESTON, BROMLEY, COUNTY OF KENT, ENGLAND.

SECONDARY BATTERY.

SPECIFICATION forming part of Letters Patent No. 318,828, dated May 26, 1885.

Application filed May 3, 1883. (No model.) Patented in England May 24, 1881, No. 2,272; in Cape of Good Hope March 25, 1882; in India April 18, 1882, No. 62; in Sweden April 21, 1882; in Victoria May 1, 1882, No. 3,208; in South Australia May 5, 1882, No. 254; in New Zealand May 17, 1882, No. 648; in Natal June 29, 1882, No. 78; in Norway August 15, 1882; in New South Wales October 18, 1882; in Denmark February 15, 1883, and in Canada March 21, 1883, No. 16,553.

*To all whom it may concern:*

Be it known that I, JOSEPH WILSON SWAN, a subject of the Queen of Great Britain, and residing at Laureston, Bromley, county of Kent, England, have invented certain Improvements in Secondary Batteries, (for which I have obtained patents in Great Britain, No. 2,272, dated May 24, 1881; Denmark, (no number,) dated February 15, 1883; Sweden, (no number,) dated April 21, 1882; Norway, (no number,) dated August 15, 1882; Cape of Good-Hope, (no number,) dated March 25, 1882; India, No. 62, dated April 18, 1882; New South Wales, (no number,) dated October 18, 1882; Victoria, No. 3,208, dated May 1, 1882; South Australia, No. 254, dated May 5, 1882; New Zealand, No. 648, dated May 17, 1882; Natal, No. 78, dated June 29, 1882, and Canada, No. 16,553, dated March 21, 1883, and in no other countries,) of which the following is a specification.

This invention has reference more particularly to secondary or storage batteries in which the electrodes or battery-plates comprise a conducting-support combined with active material in a porous condition, or condition adapted readily to become porous; and it has for its object to reduce the weight of the conducting-support and to increase the capacity and efficiency of the electrode.

Heretofore the active material has ordinarily been applied to the face or faces of a solid metal plate. This plate, in order to have sufficient rigidity to sustain its own weight and the weight of the active material, must contain considerably more metal than is required for the purposes of an electrical conductor. Moreover the layer of active material being entirely on the face of the plate, unless the said layer be comparatively thin, is not at all points in as close proximity to the support as desirable, the outer particles being more or less insulated from the plate by those intervening, and, still further, since the active material rests against a flat surface, it is liable to fall away from it and must be held in place by felt or similar perforated or porous medium. To overcome these difficulties I have used cellular corrugated, grooved, ribbed, or perforated plates as conducting-supports, thus diminishing the comparative weight of the plates without loss of rigidity, and at the same time forming recesses or receptacles for the active material. All these forms of plates are fully described in the above-recited patents of Great Britain and other countries. The present invention, however, does not consist, broadly, in the use of such plates, but only in the following special structure of the conducting-support, whereby the minimum weight with the maximum capacity of the electrode is secured—to wit, in the conducting - support formed of a plate with angular and equilateral perforations, cells, or holes extending through the same, and separated from one another by webs, walls, or partitions of uniform dimensions in cross-section. The angular perforations, cells, or holes are defined as equilateral, because it is best that each and every side should be the same; but the use of cells, holes, or perforations in which the sides are of somewhat different size is not excluded, so long as they do not differ materially—that is to say, so long as the holes, cells, or perforations are not broadened sufficiently to form slats the top and bottom of which are liable to sag in the middle, nor made sufficiently high to allow the active material to fall down to the bottom.

It is preferred that the holes, cells, or perforations in the plates should be uniform in size and shape throughout, they being hexagonal or square, or, it may be, triangular. The angular perforations, cells, or holes are superior to round ones in holding the active material more firmly, it being packed into the corners, and also in admitting of an uniform cross-section of wall between them. The webs or partitions which constitute the walls being connected with one another at short intervals, owing to the equilateral form of the holes, and being also uniform in cross-section, the plate has great rigidity with a comparatively small weight, and since the active material is distributed in the cells or perforations throughout the plate it acts as a conductor at all points in close proximity to every particle of active material.

Figure 2:

In the accompanying drawings, Figure 1 is a face view, and Fig. 2 a vertical cross-section, of a battery-plate or electrode made in accordance with the invention.

The conductive-support $a$ consists of a plate provided with hexagonal cells or perforations extending through the plate, the webs or walls between said cells or perforations being of uniform cross-section throughout. The holes, cells, or perforations may be punched in the metal plate, or they may be otherwise formed therein, as by casting. Casting is considered the best mode when the support is of fusible metal—such as lead—which it would be ordinarily. The active material $b$, (ordinarily red lead, or it may be other oxide or compound of lead, or finely-divided lead or other suitable metal or metallic compound,) is packed in the perforations or cells, and, if desired, applied also on one or both faces of the plate. The active material can be made into a paste and packed into the cells or perforations like plaster, or the application can be made in any suitable way. Electrodes prepared as described are immersed in a suitable battery-fluid—say, dilute sulphuric acid—and are connected with exterior conductors, whereby they are or may be charged and discharged. They are or may be separated by felt or other suitable medium.

It should be observed that I do not claim herein, broadly, the use of plates provided with holes or perforations extending through the same, and having the active material or material to become active held in such holes or perforations, as this forms the subject-matter of patent granted to me on the 17th day of February, 1885, numbered 312,599.

I do claim herein as my invention to be secured by Letters Patent the special improvement described, to wit:

In a battery plate or electrode composed of a conducting-support combined with active material, the support in the form of a plate with angular or equivalent holes, cells, or perforations extending through the same, and separated from one another by webs, walls, or partitions of uniform cross-section, the active material being placed in said holes, cells, or perforations, substantially as set forth.

In testimony whereof I have signed my name to this specification in the presence of two subscribing witnesses.

JOSEPH WILSON SWAN.

Witnesses:
 JOHN NEWTON,
 RUDOLPH CHAS. NECKOL,
Both of 31 Lombard Street, London.